United States Patent
Anthony et al.

(10) Patent No.: US 9,485,838 B2
(45) Date of Patent: Nov. 1, 2016

(54) LIGHTING SYSTEM FOR CONTAINED ENVIRONMENTS

(71) Applicants: Mervyn Anthony, Woburn, MA (US); Jeremy Spaulding, Marblehead, MA (US); Charles Brunault, South Hamilton, MA (US)

(72) Inventors: Mervyn Anthony, Woburn, MA (US); Jeremy Spaulding, Marblehead, MA (US); Charles Brunault, South Hamilton, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/568,883

(22) Filed: Dec. 12, 2014

(65) Prior Publication Data
US 2016/0174334 A1    Jun. 16, 2016

(51) Int. Cl.
H05B 37/02    (2006.01)
B66B 11/02    (2006.01)

(52) U.S. Cl.
CPC ....... *H05B 37/0227* (2013.01); *B66B 11/0233* (2013.01); *H05B 37/0281* (2013.01)

(58) Field of Classification Search
CPC ............ H05B 37/029; H05B 37/0272; H05B 41/3922; H05B 33/0863; H05B 37/02; H04N 9/3155; Y02B 20/48; G03B 21/00; G03B 21/2033; G03B 21/2053
USPC ....... 315/149, 158, 292, 294, 297, 312, 318, 315/307; 362/234, 236, 231, 233
See application file for complete search history.

(56) References Cited

U.S. PATENT DOCUMENTS

| | | | |
|---|---|---|---|
| 7,228,190 B2* | 6/2007 | Dowling | A63J 17/00 340/815.46 |
| 7,358,929 B2* | 4/2008 | Mueller | E04F 13/08 345/1.1 |
| 7,703,944 B2* | 4/2010 | Fluss | H05B 33/0863 362/231 |
| 8,094,964 B2* | 1/2012 | Hadap | G06T 7/0042 345/426 |
| 8,842,009 B2* | 9/2014 | Jones | H05B 37/0272 340/468 |
| 9,081,265 B2* | 7/2015 | Spaulding | H04N 9/3105 |
| 9,082,202 B2* | 7/2015 | Kovesi | G06T 7/2053 |
| 2005/0275626 A1* | 12/2005 | Mueller | H05B 37/029 345/156 |
| 2007/0251766 A1 | 11/2007 | Oberer | |
| 2009/0240311 A1 | 9/2009 | Andersen | |
| 2010/0327766 A1 | 12/2010 | Recker et al. | |
| 2014/0055041 A1 | 2/2014 | Ramer et al. | |
| 2014/0168610 A1 | 6/2014 | Spaulding | |
| 2014/0266669 A1* | 9/2014 | Fadell | G05B 19/042 340/501 |

* cited by examiner

*Primary Examiner* — Haissa Philogene
(74) *Attorney, Agent, or Firm* — Edward S. Podszus

(57) ABSTRACT

Techniques and architecture are disclosed for a lighting system for contained environments, such as elevators or other such environments. The lighting system can include one or more luminaires and/or one or more display devices that include tunable output controlled to automatically change the ambient lighting and/or presentable content (e.g., imagery, video, audio) based on one or more conditions related to the contained environment. Conditions that can be used in controlling the lighting system output within the contained environment can include, for example, the position or operation of the contained environment, the control of the contained environment, the occupancy within the contained environment, the time of day at the location of the contained environment, and the calendar date at the location of the contained environment. In some cases, the lighting system may constitute the general illumination within the contained environment, but may be supplemental as well.

15 Claims, 3 Drawing Sheets

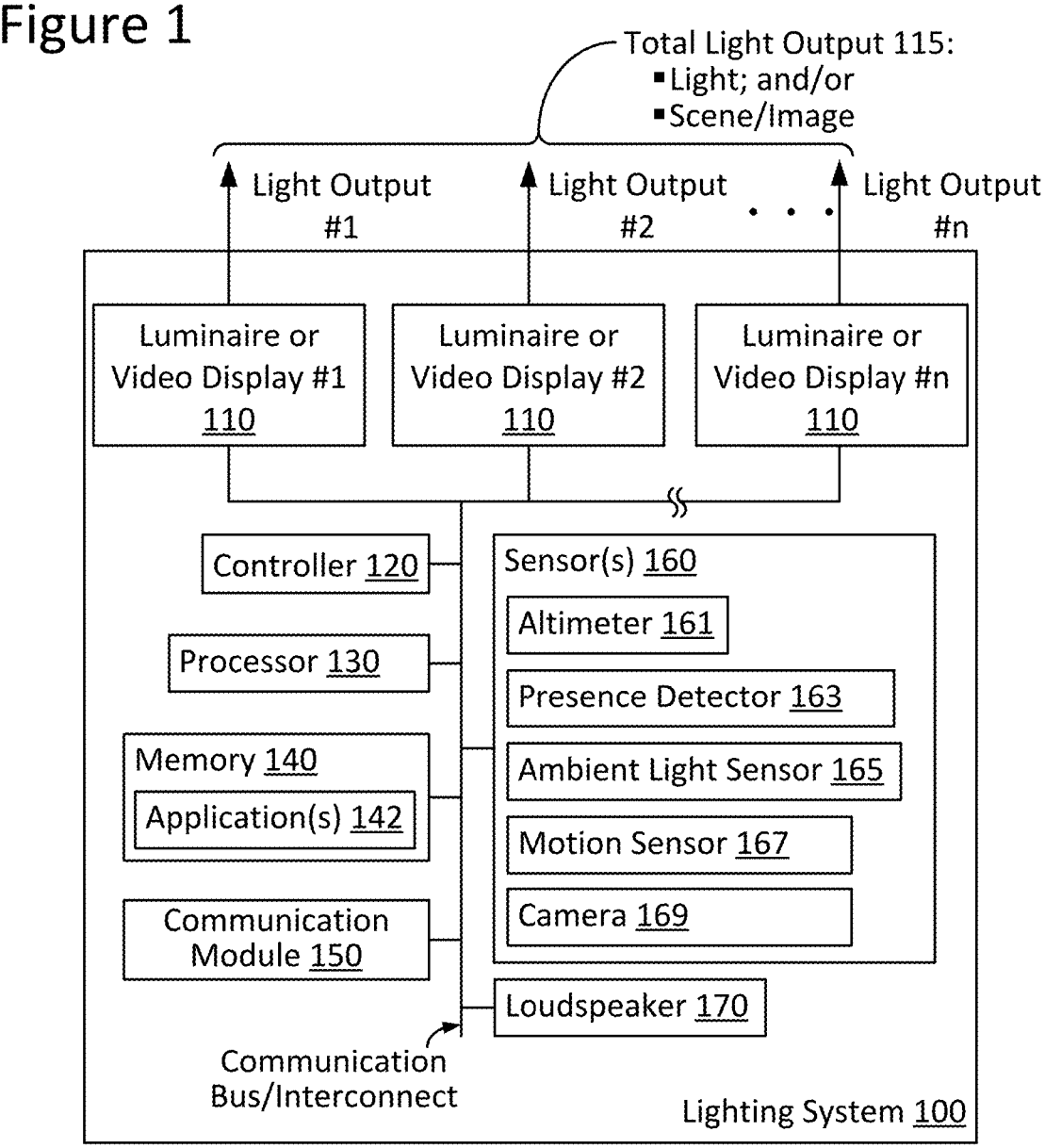

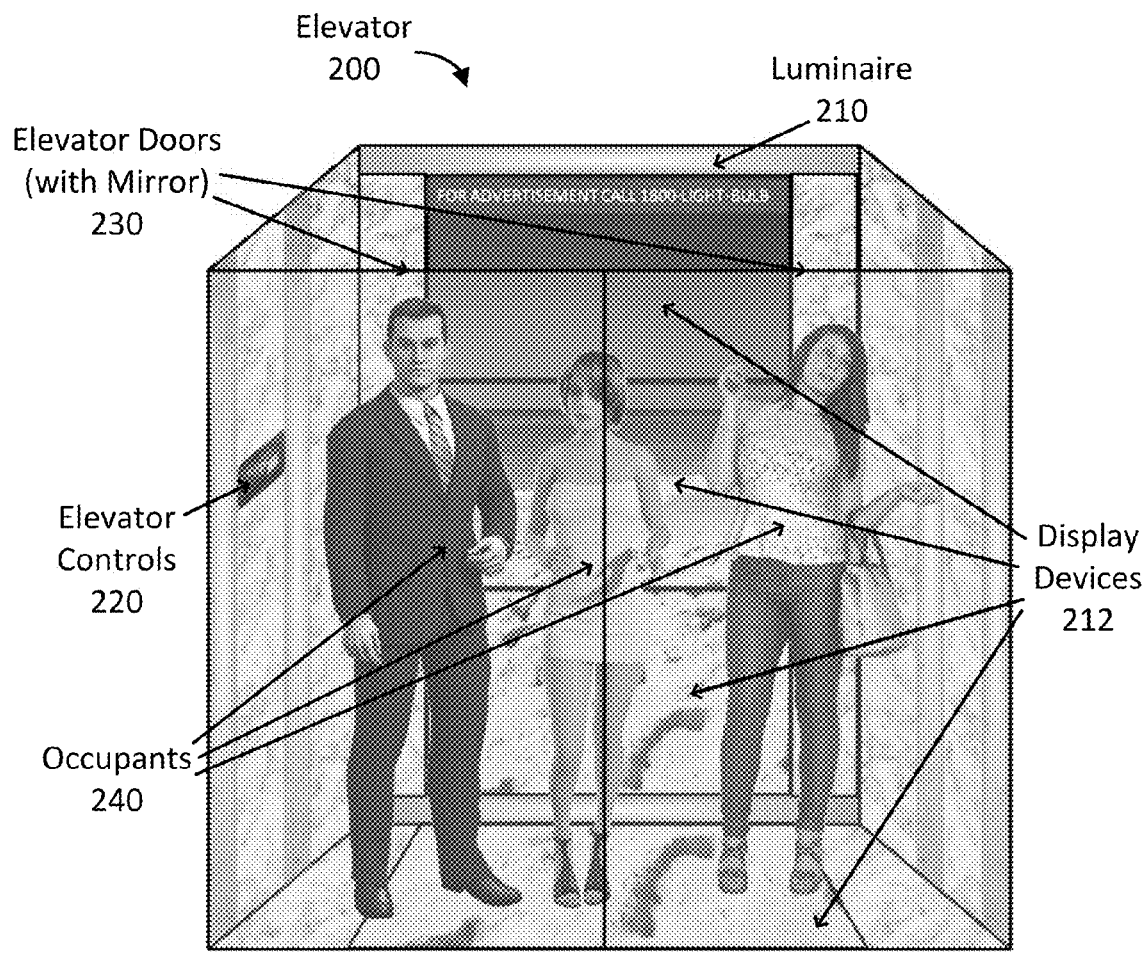

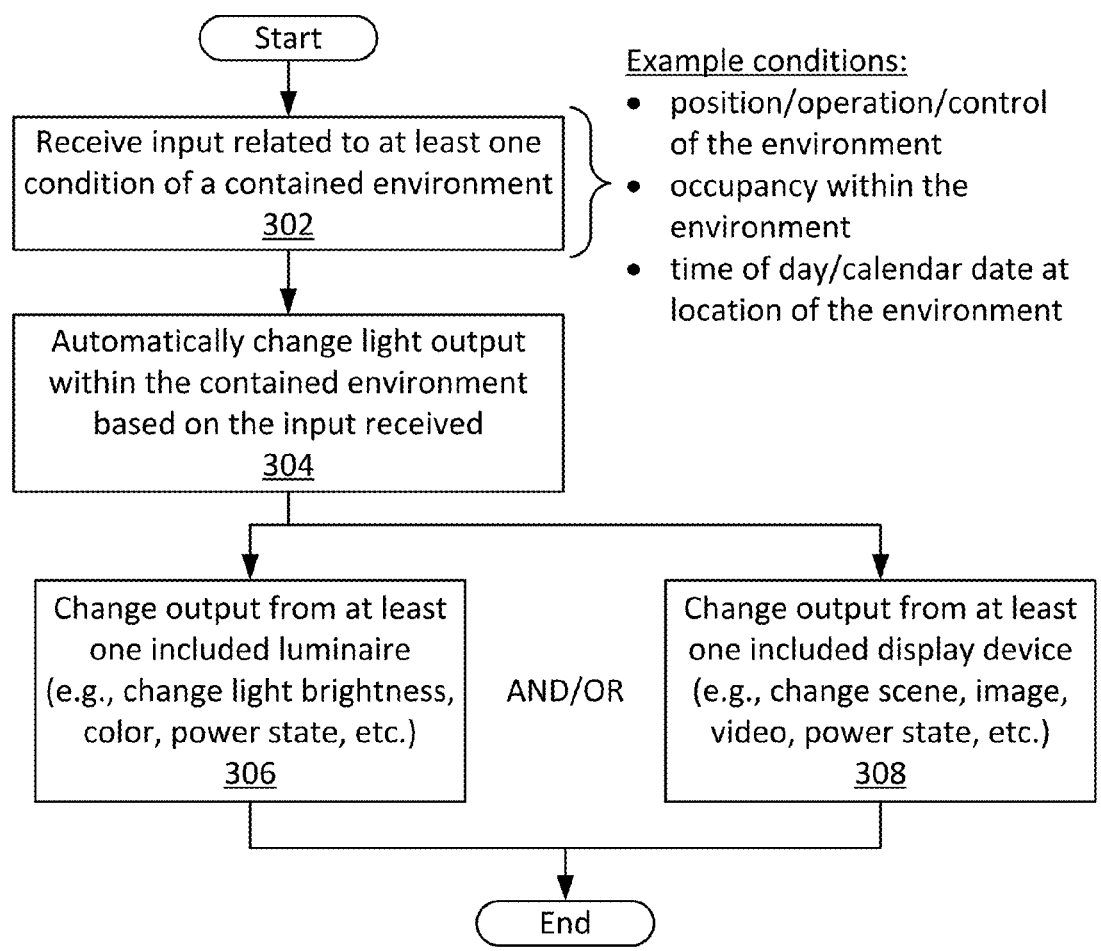

LIGHTING SYSTEM FOR CONTAINED ENVIRONMENTS

FIELD OF THE DISCLOSURE

The present disclosure relates to lighting technology, and more particularly to a lighting system for contained environments.

BACKGROUND

Designing lighting systems for different environments involves a number of non-trivial challenges, and designing lighting systems for contained or confined environments includes particular issues.

BRIEF DESCRIPTION OF THE DRAWINGS

FIG. 1 illustrates an example lighting system for contained environments, in accordance with one or more embodiments of the present disclosure.

FIG. 2 illustrates an example lighting system for an elevator, in accordance with an embodiment of the present disclosure.

FIG. 3 illustrates an example method of controlling a lighting system for a contained environment, in accordance with one or more embodiments of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Techniques and architecture are disclosed for a lighting system for contained environments, such as elevators, vehicles, amusement rides, closets, hallways, or other such environments. The lighting system can include one or more luminaires and/or one or more display devices that include tunable output controlled to automatically change the ambient lighting and/or presentable content (e.g., imagery, video, audio) based on one or more conditions related to the contained environment. Conditions that can be used in controlling the lighting system output within the contained environment can include, for example, the position or operation of the contained environment, the control of the contained environment, the occupancy within the contained environment, the time of day at the location of the contained environment, and the calendar date at the location of the contained environment. In this manner, the system can provide a simulated virtual reality lighting experience to make the environment more pleasing and engaging. In some cases, the lighting system may constitute the general illumination within the contained environment, but may be supplemental as well. Numerous configurations and variations will be apparent in light of this disclosure.

General Overview

As previously noted, there are a number of non-trivial challenges that can contribute to the difficulty in designing a lighting system for a contained environment. Confined and contained environments, such as those found in elevators and closets, typically provide a general lighting scheme of white light. While such lighting is suitable for its basic purpose or illumination of the given space, it tends to provide a suboptimal experience for occupants of the space. For example, lighting systems in contained environments typically do not enhance the user experience in an engaging or experiential manner. In some cases, it may be desirable to take advantage of the unique properties of contained environments, such as the movement of the contained environments, for example, to make the lighting experience of such environments more pleasing or engaging.

Thus, and in accordance with an embodiment of the present disclosure, a lighting system for contained environments is disclosed. Generally, the lighting system can be designed to replace or augment general illumination in contained environments to incorporate a simulated virtual reality lighting experience. In some embodiments, the system can include one or more luminaires, display devices, or a combination thereof. In some such embodiments, where the system includes a plurality of light-yielding components (e.g., luminaires and/or display devices), the two or more components can be controlled by a controller and/or processor to synchronize the various light outputs emitted or otherwise provided from the light-yielding components. In this manner, the total light output within the contained environment can be controlled using a controller or processor. In any such case, the lighting system can include tunable light output that is emitted from the luminaire(s) and/or display device(s) and that is controlled to automatically change based on one or more conditions related to the contained environment. Conditions that can be used in controlling the light output within the contained environment can include the position or operation of the contained environment, the control of the contained environment, the occupancy within the contained environment, the time of day at the location of the contained environment, and the calendar date at the location of the contained environment, just to name a few example conditions.

As will be apparent in light of this disclosure, light output can be changed within a contained environment using numerous different techniques. In some cases, changing the total light output within the environment may involve changing the light output from at least one luminaire and/or display device in the lighting system. In some instances, light output changes may include altering the illumination with respect to intensity or brightness, color, distribution or spread, focus, and/or any other suitable property of the light provided within the environment. In some instances, light output changes may include turning on or off individual luminaires or display devices, or turning on or off specific light sources of the luminaires or display devices. In the case of display devices, note that light output changes may include changing the scene/image/video displayed, whether or not the device is displaying content in 2D or 3D, and/or any other suitable property of the display device output. However, note that in some cases, a luminaire(s) included with the system may also be configured to output a scene, image, or video. Also note that in some cases, the luminaire(s) may be configured to supplement the scene, image, or video output by the display device(s) to, for example, enhance the experience. Numerous different techniques for changing light output within a contained environment will be apparent in light of this disclosure.

In some embodiments, the system may be configured to automatically change the light output emitted in a contained environment based on the operation or movement of that environment. For example, in the case of an elevator, the system may be configured to automatically change the light output within the elevator based on the height of the elevator, which may be detected using an altimeter or other suitable sensor. In such an example, the illumination within the elevator and/or the scenes displayed may automatically change to simulate a virtual ascent as the elevator actually moves upward and a virtual descent as the elevator actually moves downward. In this manner, the system may be configured to control the light output based on the position, movement, acceleration, deceleration, or location of the contained environment. In some instances, the light output within the contained environment may mimic the external environment. For example, as the elevator ascends/descends, light output within the elevator may imitate, at a similar height outside of the building containing the elevator, the view, weather, sun level, or any other suitable virtual reality lighting experience based on a given target application or end-use.

In some embodiments, the system may be configured to automatically change the light output emitted in a contained environment based on the control of that environment. For example, in the case of an elevator, the elevator controls may be communicatively coupled or otherwise integrated with the lighting system, such that input provided to the controls automatically changes the light output emitted by the system. In such an example, the system may include a touch screen display that allows the user to control the operation of the elevator to a specific experience, as opposed to a specific floor, whereby the light output automatically changes based on the specific experience selected. For instance, if the elevator is contained in a building that has a night club on the top floor, when the night club top floor is selected, the lighting system may be configured to automatically change the light output within the elevator to set the mood for the night club. In such an example instance, the height of the elevator, the time of day, and/or the calendar date may also be used to control the lighting system. For example, the elevator may slowly transition to a night club experience as the elevator height increases and draws nearer to the top floor. In another example, the time of day may dictate whether the night club lighting experience within the elevator is used when the top floor is selected (e.g., activate the night club lighting experience between 10 pm and 3 am). In yet another example, the calendar date may dictate whether a special event is occurring in the night club and the elevator light system may be configured to emit a special light output sequence based on that event.

In some embodiments, the lighting system may be configured to automatically change the light output in a contained environment based on the occupancy within the environment. For example, in the case of an elevator, the lighting system may be configured to automatically change the light output based on people entering or leaving the elevator. In such an example, the system may utilize a presence detector or sensor or social media to determine the occupancy within the environment. In such a case, the system may be configured to automatically change the light output in the environment based on the number of occupants. For instance, if the occupancy exceeds a predetermined threshold, then the system may be configured to automatically change the light output, such as turning on additional display devices to help ensure that the additional occupants can see the displayed images/videos within the elevator, for example. In another example, the light output may change based on the position of the occupants within the contained environment. For instance, in the case of a bus or other transportation vehicle, the lighting system may be configured to detect the location of occupants within the vehicle and adjust the light output accordingly to, for example, provide illumination in the area of each occupant.

In some embodiments, the lighting system may be configured to automatically change the light output in a contained environment based on the time of day and/or calendar date at the location of the contained environment. In such embodiments, the system may use any suitable technique to retrieve or receive time of day and/or calendar date information. For example, in the case of an elevator, the lighting system may be configured to automatically change the light output to display advertisements or specific content based on the time of day, calendar date, and/or position of the contained environment. In such an example, if the elevator is passing a floor that includes a restaurant, the system may be configured to automatically display specific advertisements for the restaurant based on the time of day (e.g., advertisements related to lunch from 11 am to 2 pm and advertisements related to dinner from 2 pm to 10 pm). In another example case, the system may be configured to automatically change the light output based on a holiday or other event occurring on the calendar date at the location of the elevator. In such an example, the display devices may be configured to display a message related to a holiday greeting, a birthday, a work-related notification, or any other suitable information.

Furthermore, and in accordance with some embodiments, a lighting system designed using the disclosed techniques/architecture can be provided, for example, as: (1) a partially/completely assembled lighting system; and/or (2) a kit or other collection of separate components (e.g., luminaires, display devices, controller, processor, etc.) which may be operatively coupled to form a lighting system as variously described herein. In some embodiments, the lighting system is highly configurable and scalable, and it can be programmed or otherwise configured to automatically change light output within a contained environment using the techniques variously described herein. In some embodiments, the lighting system may replace the general illumination within the contained environment and thus the light output from the system may constitute approximately all of the illumination within the environment, while in other embodiments, the lighting system may augment illumination provided by other light sources within the environment. In some embodiments, the system may include one or more loudspeakers or sound producing devices that are controlled such that the audio output synchronizes with the light output within the contained environment to, for example, further enhance the virtual reality experience. Numerous variations and configurations will be apparent in light of the present disclosure.

System Architecture and Operation

FIG. 1 illustrates a block diagram illustrating an example lighting system 100 for contained environments in accordance with one or more embodiments of the present disclosure. As can be seen, system 100 may include one or more luminaires and/or display devices 110 that each provide corresponding light output. In other words, in some embodiments, system 100 may include one luminaire, one display device, multiple luminaires, multiple display devices, one luminaire and one display device, one luminaire and multiple display devices, multiple luminaires and one display device, or multiple luminaires and multiple display devices. The number n of luminaires and/or display devices 110 in a given system 100 can be customized as desired for a given target application or end-use.

A luminaire or display device 110 of system 100 may each include one or more solid-state light sources, in accordance with some embodiments. A given solid-state light source may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof.

In some embodiments, luminaires 110 included in the system 100 may include other light sources in addition to or in the alternative of solid-state light sources, such as incandescent or fluorescent lighting, for example. The quantity and arrangement of lighting sources utilized for each luminaire may be customized as desired for a given target application or end-use. In some embodiments, display devices 110 of the system 100 may include other light sources in addition to or in the alternative of solid-state light sources, such as plasmas or fluorescent lighting, for example. In some embodiments, the display devices may include televisions, monitors, or projectors, just to name a few display device examples. In the case of a projector being included in the system 100, the projector may display images or scenes on a wall or other suitable surface of the contained environment, or the system 100 may include a screen to be used in conjunction with the projector. In embodiments including display devices, the devices may be integrated into, affixed to, or otherwise connected with some section of the contained environment (e.g., wall, ceiling, floor, etc.).

As can be seen in FIG. 1, a given lighting system 100 may include at least one controller 120, at least one processor 130, and/or memory 140. Controller(s) 120 may be configured to be operatively coupled (e.g., via communication bus/interconnect) with luminaires/display devices 110 to control the light output provided therefrom. Recall that light output may include illumination provided by luminaires of the system 100 and/or scenes or images (or video) displayed on display devices of the system 100. In some embodiments, system 100 may include a centralized controller 120 and/or processor 130 configured to control the total light output 115 of the entire system. In some such embodiments, the control of the light output may be wired and/or wireless, depending upon the given configuration. In some embodiments, the luminaires/display devices 110 may be individually controlled in addition to being controllable by a central controller 120 and/or processor 130. In any case, the total light output 115 can be automatically changed using the techniques variously described herein, such as automatically changing light output based on one or more conditions related to the contained environment. Recall that the conditions can include the position or operation of the contained environment, the control of the contained environment, the occupancy within the contained environment, the time of day at the location of the contained environment, and the calendar date at the location of the contained environment, just to name a few example conditions.

As will be apparent in light of this disclosure, controlling the total light output 115 of system 100 may include numerous different techniques, depending upon the given configuration or end use. For example, in some cases, controlling the light output 115 may include changing the light output from a single luminaire or display device 110 or multiple luminaires/display devices 110. In some instances, the light output 115 may be controlled by altering the light output of individual luminaires/display devices 110 with respect to intensity or brightness, color, distribution or spread, focus, and/or any other suitable property of the light provided within the environment. In some instances, light output may be controlled by turning individual luminaires/display devices 110 on or off, or by turning specific light sources within a given luminaire/display device 110 on or off. In the case of display devices, light output may be controlled by changing the scene, image, or video displayed therefrom. In this manner, controller 120 and/or processor 130 can be configured to achieve various desired visual results.

Memory 140 can be of any suitable type (e.g., RAM and/or ROM, or other suitable memory) and size, and in some cases may be implemented with volatile memory, non-volatile memory, or a combination thereof. A given processor 130 may be configured as typically done, and in some embodiments may be configured, for example, to perform operations associated with system 100 or a given luminaire/display device 110 and one or more of the modules thereof (e.g., within memory 140 or elsewhere). In some cases, memory 140 may be configured to be utilized, for example, for processor workspace (e.g., for one or more processors 130) and/or to store media, programs, applications, and/or content for the system 100 on a temporary or permanent basis.

The one or more modules stored in memory 140 can be accessed and executed, for example, by the one or more processors 130 of system 100. In accordance with some embodiments, a given module of memory 140 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 140 can be encoded, for example, on a machine-readable medium that, when executed by a processor 130, carries out the functionality of system 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 140 (e.g., one or more applications 142, discussed below) can be implemented in hardware, software, and/or firmware, as desired for a given target application or end-use.

In accordance with some embodiments, memory 140 may have stored therein (or otherwise have access to) one or more applications 142. In some instances, a given system 100 may be configured to receive input, for example, via one or more applications 142 stored in memory 140. For instance, an example application 142 may allow a user to program or configure system 100, such as the light output and the conditions that may cause automatic changes in the light output. Other suitable modules, applications, and data which may be stored in memory 140 (or may be otherwise accessible to system 100) will depend on a given application and will be apparent in light of this disclosure.

In accordance with some embodiments, a given system 100 may include a communication module 150, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 150 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 150, as desired for a given target application or end-use. In some instances, communication module 150 may be configured to facilitate inter-system communication between luminaire(s)/display devices(s) 110 and controller(s) 120, processor(s) 130, and/or memory. Other suitable configurations for communication module 150 will depend on a given application and will be apparent in light of this disclosure.

In accordance with some embodiments, a given system 100 may include one or more optional sensors 160. In some embodiments, a given system 100 for a contained environment may optionally include at least one altimeter 161, presence detector 163, ambient light sensor 165, motion sensor 167, camera 169, and/or any other suitable sensor to, for example, implement the techniques variously described herein. When included, sensor(s) 160 may be configured as typically done. In any case, the sensor(s) 160 of a given system 100 may include componentry as desired for a given target application or end-use. Also, it should be noted that the present disclosure is not so limited only to the example optional sensors 160 shown, as additional and/or different sensors 160 may be provided, as desired for a given target application or end-use, in accordance with some other embodiments.

In accordance with some embodiments, a given system 100 may include one or more loudspeakers 170 or other sound producing devices. Loudspeaker(s) 170 may be programmed using any suitable techniques and they may be configured to output audio based on one or more of the conditions of a contained environment as variously described herein (e.g., the position or operation of the environment, the occupancy within the contained environment, etc.). For example, controller 120 and/or processor 130 may be configured to control audio output of the loudspeaker(s) 170 to synchronize with the light output within the contained environment to further enhance the virtual reality experience. When included, loudspeaker(s) 170 may be configured as typically done and may include componentry as desired for a given target application or end-use.

In accordance with some embodiments, the disclosed techniques can be implemented using other suitable lighting systems, such as the lighting system described, for example, in U.S. Patent Publication No. US2014/0168610A1 (U.S. application Ser. No. 13/716,773), filed on Dec. 17, 2012, titled "DECENTRALIZED INTELLIGENT NODAL LIGHTING SYSTEM", which is herein incorporated by reference in its entirety. For example, the luminaires and/or display devices 110 of system 100 may be configured to be individual nodes within an intelligent nodal lighting system as variously described in the US2014/0168610A1 publication. In such an example, the various outputs provided by the nodes (the luminaires and display devices 110) may be synchronized to achieve a desired total light output 115. Further, the nodes may be controlled using a wireless protocol (e.g., Wi-Fi, Bluetooth, etc.), and each node in the system may have its own independent identification or address to receive, store, and interpret commands from a wirelessly connected centralized controller (e.g., controller 120 and/or processor 130). Further yet, in some cases, each node may contain memory and a processor for storing and interpreting commands from the centralized controller to achieve the desired light output in the contained environment. In some such cases, the centralized controller and/or the local node processor may determine whether the desired output settings are within the capabilities of the individual node (e.g., within the capabilities of the specific luminaire or display device 110). If the settings are within the capabilities of the node, then the output is emitted accordingly; however, if the settings are outside of the capabilities of the node, the best/closest available setting may be selected to provide the best/closest output. In addition, the nodes may be dynamically added or removed from the lighting system without interrupting the operation of the system.

FIG. 2 illustrates an example lighting system for an elevator 200, in accordance with an embodiment of the present disclosure. As can be seen, elevator 200 includes luminaire 210, display devices 212, elevator controls 220, doors 230 (with integrated mirrors or reflective interior surfaces), and three occupants 240 within elevator 200. Luminaire 210 and display devices 212 can be configured as variously described herein, and in this example embodiment, they are controlled by a centralized controller and/or processor to provide light output within elevator 200. The light output shown in FIG. 2 includes the light output emitted by luminaire 210 and the light output emitted by display devices 212. More specifically, the light output by display devices 212 includes the display of an advertisement and a beach scene.

In this example lighting system, the system includes a controller and/or processor configured to automatically change the light output emitted from luminaire 210 and display devices 212 based on one or more conditions as variously described herein (e.g., the position or operation of the elevator, the occupancy within the elevator, etc.). For example, the elevator controls 220 may be operatively coupled with the controller of the lighting system such that when a user enters a command using elevator controls 220, the controller of the lighting system may be configured to automatically change the light output emitted from luminaire 210 and/or display devices 212. For instance, in such an example, the scene on display devices 212 may change based on the command entered. In another example, the presence of the third occupant 240 may have been detected by a presence sensor (not shown) when the occupant 240 entered the elevator 200, causing the system controller to automatically change the light output emitted from luminaire 210 to, for example, increase the brightness and/or spread of the light output to account for the additional occupant. Numerous applications of the example lighting system in elevator 200 will be apparent in light of the present disclosure.

Although the lighting system in FIG. 2 is shown in the context of an elevator 200, the lighting system as variously described herein can be used with any suitable contained environment. For example, other suitable contained environments may include: vehicles, such as busses, trains, subways, trams, trailers, planes, boats, automobiles, etc.; amusement rides; moving stairways or escalators, and the contained environment around them; closets or other contained rooms; and tunnels. Note that, in some embodiments, contained environments as variously described herein need not be fully enclosed. Also note that, in some embodiments, the contained environments may include light output from sources other than the lighting system variously described herein. Further note that any surface of a contained environment may be used for the lighting system, such for installing luminaires/display devices, including a wall, floor, ceiling, door, window, or other suitable surface of the contained environment, depending upon the targeted application or end-use. Numerous configurations and variations will be apparent in light of this disclosure.

Methodology

FIG. 3 illustrates an example method of controlling a lighting system for a contained environment, in accordance with one or more embodiments of the present disclosure. As can be seen, the method includes receiving 302 input related to at least one condition of a contained environment. The conditions may include, but are not limited to: the position, operation, or control of the contained environment; occupancy within the contained environment; the time of day or calendar date at the location of the contained environment; or any other suitable condition of the contained environment as will be apparent in light of this disclosure. The input received at 302 may include input from a processor or application of the lighting system, from one or more sensors communicatively coupled to the lighting system, or from another suitable source capable of providing information related to the contained environment.

The method continues with automatically changing 304 light output within the contained environment based on the input received at 302. In some embodiments, the light output may be automatically changed 304 in response to a change in one of the conditions related to the contained environment. For example, in the case where the contained environment is an elevator, input received at 302 related to a change in the position of the elevator may cause an automatic change at 304 in the light output within the elevator. Recall that light output may be emitted or otherwise provided from one or more luminaires and/or display devices within the contained environment. Therefore, the method may continue with changing 306 output from at least one luminaire included in the lighting system and/or changing 308 output from at least one display device included in the system. Changes 306 to a luminaire output may include a change with respect to light intensity or brightness, color, distribution or spread, focus, power states (e.g., on/off state of light sources within luminaire), and/or any other suitable property of the luminaire output. Changes 308 to a display device output may include a change with respect to the scene/image/video displayed, the power state of the device, the intensity or brightness of the device, whether or not the device is displaying content in 2D or 3D, and/or a change to any other suitable property of the display device output. In some embodiments, the method may include automatically changing the output (e.g., audio output, volume, etc.) from at least one speaker or sound producing device included with the system based on the input received at 302.

Numerous variations on the methodology of FIG. 3 will be apparent in light of this disclosure. In some embodiments, the method may be implemented by, for example, controller 120 and/or processor 130 of lighting system 100, as shown in FIG. 1 and described herein. As will be appreciated, and in accordance with some embodiments, each of the functional boxes 302, 304, 306, and 308 shown in FIG. 3 can be implemented, for example, as a module or sub-module that, when executed by one or more controllers 120 and/or processors 130 or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field-programmable gate array, purpose-built silicon, etc.). In some embodiments, a non-transitory computer program product comprising a plurality of instructions non-transiently encoded thereon that, when executed by one or more processors, cause a process to be carried out, the process including the functionality of the methodology and techniques variously described herein. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories.

Numerous embodiments will be apparent in light of this disclosure. One example embodiment provides a lighting system for a contained environment, the system including a luminaire including at least one solid-state light source and configured to emit a first light output in the contained environment; a display device including a plurality of solid-state light sources and configured to emit a second light output in the contained environment; and a controller operatively coupled to the luminaire and display device. The controller is configured to automatically change the light output in the contained environment based on at least one of: the contained environment position, the contained environment occupancy, the time of day at the contained environment location, and the calendar date at the contained environment location. In some cases, the controller is configured to automatically change the light output in response to a change in the position of the contained environment. In some cases, the controller is configured to automatically change the light output in response to input provided to operate the contained environment. In some cases, the controller is configured to control at least one operation of the contained environment. In some cases, the system includes at least one sensor configured to determine occupancy within the contained environment. In some such cases, the controller is configured to automatically change the light output when the at least one sensor detects that occupancy has exceeded a predetermined threshold. In some cases, the light output includes at least one of an image, scene, video, message, and advertisement. In some cases, the display device is installed on or in at least one of the floor, ceiling, and wall of the contained environment. In some cases, the system includes a loudspeaker operatively coupled to the controller and configured to output audio in the contained environment based on the light output in the contained environment. In some cases, the light output constitutes approximately all of the illumination within the contained environment. In some cases, wherein the controller is configured to automatically change the light output in the contained environment based on at least two of: the contained environment position, the contained environment occupancy, the time of day at the contained environment location, and the calendar date at the contained environment location. In some cases, an elevator system includes the lighting system. In some cases, an amusement system includes the lighting system.

Another example embodiment provides a method of controlling a lighting system for a contained environment, the method including receiving input related to at least one of: the contained environment position, the contained environment occupancy, the time of day at the contained environment location, and the calendar date at the contained environment location; and automatically changing light output within the contained environment based on the input received, wherein the light output is emitted from solid-state light sources of a luminaire and a display device. In some cases, the input is received from at least one sensor utilized to determine a condition of the contained environment. In some cases, the light output is automatically changed in response to movement of the contained environment. In some cases, the light output is automatically changed in response to input provided to operate the contained environment. In some cases, the light output includes at least one of an image, scene, video, message, and advertisement. In some cases, the light output constitutes approximately all of the illumination within the contained environment. In some cases, the input received relates to at least two of: the contained environment position, the contained environment occupancy, the time of day at the contained environment location, the calendar date at the contained environment location, and the operation.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A lighting system for a contained environment, the system comprising:
   a luminaire including at least one solid-state light source and configured to recreate a lighting environment of a remote location in the contained environment;
   a display device including a plurality of solid-state light sources and configured to display images from the remote location wherein the luminaire provides the lighting environment in concert with images displayed on the display device; and
   a controller operatively coupled to the luminaire and the display device, wherein the controller is configured to automatically change the light output emitted in the contained environment by the luminaire and the display device based on a destination floor of the contained environment location, wherein the contained environment is an elevator.

2. The system of claim 1, wherein the light output constitutes approximately all of the illumination within the contained environment.

3. The system of claim 1, wherein the controller is configured to automatically change the light output in response to input provided to operate the contained environment.

4. The system of claim 1, wherein the controller is further configured to control at least one operation of the contained environment.

5. The system of claim 1, further comprising at least one sensor configured to determine occupancy within the contained environment.

6. The system of claim 5, wherein the controller is configured to automatically change the light output when the at least one sensor detects that occupancy has exceeded a predetermined threshold.

7. The system of claim 1, wherein the light output includes at least one of an image, scene, video, message, and advertisement.

8. The system of claim 1, wherein the display device is installed on or in at least one of the floor, ceiling, and wall of the contained environment.

9. The system of claim 1, further comprising a loudspeaker operatively coupled to the controller and configured to output audio in the contained environment based on the light output in the contained environment.

10. A method of controlling a lighting system for an elevator, the method comprising:
    receiving input related to a destination floor of the elevator and at least one of: the elevator position, the elevator occupancy, the time of day at the elevator location, and the calendar date at the elevator location; and
    automatically changing light output within the elevator based on the input received, wherein the light output is emitted from solid-state light sources of a luminaire configured to recreate a lighting environment of a remote location in the elevator and a display device configured to display images from the remote location, wherein the luminaire provides the lighting environment in concert with images displayed on the display device based on the received input.

11. The method of claim 10, wherein the light output is automatically changed in response to movement of the elevator.

12. The method of claim 10, wherein the light output is automatically changed in response to input provided to operate the elevator.

13. The method of claim 10, wherein the light output includes at least one of an image, scene, video, message, and advertisement.

14. The method of claim 10, wherein the light output constitutes approximately all of the illumination within the elevator.

15. The method of claim 10, wherein the input is received from at least one sensor utilized to determine a condition of the elevator.

* * * * *